US00RE50611E

(19) United States
(12) Reissued Patent
Lee et al.

(10) Patent Number: US RE50,611 E
(45) Date of Reissued Patent: *Sep. 30, 2025

(54) SIGNAL TRANSMISSION METHOD FOR ESTIMATING PHASE NOISE IN WIRELESS COMMUNICATION SYSTEM

(71) Applicant: LG Electronics Inc., Seoul (KR)

(72) Inventors: Kilbom Lee, Seoul (KR); Jaehoon Chung, Seoul (KR); Kyuseok Kim, Seoul (KR); Minki Ahn, Seoul (KR)

(73) Assignee: LG Electronics Inc., Seoul (KR)

( * ) Notice: This patent is subject to a terminal disclaimer.

(21) Appl. No.: 17/720,889

(22) Filed: Apr. 14, 2022

Related U.S. Patent Documents

Reissue of:
(64) Patent No.: 10,938,616
Issued: Mar. 2, 2021
Appl. No.: 16/738,515
Filed: Jan. 9, 2020

U.S. Applications:
(63) Continuation of application No. 16/064,977, filed as application No. PCT/KR2017/002570 on Mar. 9, 2017, now Pat. No. 10,587,446.

(60) Provisional application No. 62/327,410, filed on Apr. 25, 2016.

(51) Int. Cl.

| | |
|---|---|
| ***H04L 27/26*** | (2006.01) |
| ***H04B 7/01*** | (2006.01) |
| ***H04B 7/06*** | (2006.01) |
| ***H04J 13/00*** | (2011.01) |

(Continued)

(52) U.S. Cl.
CPC ..... *H04L 5/0048* (2013.01); *H04B 7/01* (2013.01); *H04B 7/0617* (2013.01); *H04B 7/0626* (2013.01); *H04J 13/0062* (2013.01); *H04L 5/00* (2013.01); *H04L 25/023* (2013.01);
(Continued)

(58) Field of Classification Search
CPC ..... H04L 5/0048; H04L 5/00; H04L 25/023; H04L 27/26; H04L 27/261; H04L 27/2675; H04L 5/0007; H04B 7/01; H04B 7/0617; H04B 7/0626; H04J 13/0062
See application file for complete search history.

(56) References Cited

U.S. PATENT DOCUMENTS

| | | | | |
|---|---|---|---|---|
| 10,587,446 | B2 * | 3/2020 | Lee | H04L 27/26 |
| 10,938,616 | B2 * | 3/2021 | Lee | H04L 5/0048 |
| 10,965,499 | B2 * | 3/2021 | Lee | H04L 25/0226 |

(Continued)

FOREIGN PATENT DOCUMENTS

| | | |
|---|---|---|
| CN | 103891166 | 6/2014 |
| JP | 2013232766 | 11/2013 |

(Continued)

OTHER PUBLICATIONS

International Search Report in International Application No. PCT/KR2017/002570, dated May 23, 2017, 10 pages.

(Continued)

*Primary Examiner* — David E England
(74) *Attorney, Agent, or Firm* — Fish & Richardson P.C.

(57) ABSTRACT

Disclosed are a signal transmission method and a base station, the method: generating a PCRS used in order to remove phase noise from a downlink signal; mapping the PCRS at predetermined intervals on a region, in which a data channel is mapped, in a downlink resource region; and transmitting the PCRS to a terminal.

40 Claims, 11 Drawing Sheets

(a)

(b)

(51) Int. Cl.
*H04L 5/00* (2006.01)
*H04L 25/02* (2006.01)

(52) U.S. Cl.
CPC ..... *H04L 27/26* (2013.01); *H04L 27/261* (2013.01); *H04L 27/2675* (2013.01); *H04L 5/0007* (2013.01)

(56) References Cited

U.S. PATENT DOCUMENTS

| | | | |
|---|---|---|---|
| 11,489,709 | B2 * | 11/2022 | Yokomakura ..... H04L 27/2602 |
| 2010/0111018 | A1 | 5/2010 | Chang |
| 2011/0040666 | A1 | 2/2011 | Crabtree et al. |
| 2013/0328706 | A1 | 12/2013 | Marom |
| 2014/0119317 | A1 | 5/2014 | Kim |
| 2015/0098535 | A1 | 4/2015 | Wu et al. |
| 2015/0156752 | A1 | 6/2015 | Liu |
| 2015/0282171 | A1 | 10/2015 | Yu et al. |
| 2015/0311986 | A1 | 10/2015 | Thomas et al. |
| 2016/0006594 | A1 | 1/2016 | Persson et al. |
| 2016/0226640 | A1 | 8/2016 | Seol |
| 2019/0109747 | A1 | 4/2019 | Hessler |

FOREIGN PATENT DOCUMENTS

| | | |
|---|---|---|
| KR | 1020080060292 | 7/2008 |
| KR | 1020110091839 | 8/2011 |
| WO | WO2011110964 | 9/2011 |
| WO | WO2016048074 | 3/2016 |

OTHER PUBLICATIONS

Chinese Office Action in Chinese Application No. 201780037238.3, dated Dec. 2, 2020, 16 pages (with English translation).

* cited by examiner

-AMENDED-

-AMENDED-

-AMENDED-

FIG. 12

| Configuration | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | DL Control | DL Data | DL Data | DL Data | DL Data | DL Data | DL Data | DL Data | DL Data | DL Data | DL Data | DL Data | DL Data | DL Data |
| | DL Control | DL Data | DL Data | DL Data | DL Data | DL Data | DL Data | DL Data | DL Data | DL Data | DL Data | DL Data | DL Data | DL Data |
| 1 | DL Control | DL Control | DL Data | DL Data | DL Data | DL Data | DL Data | DL Data | DL Data | DL Data | DL Data | DL Data | DL Data | DL Data |
| | DL Control | DL Control | DL Data | DL Data | DL Data | DL Data | DL Data | DL Data | DL Data | DL Data | DL Data | DL Data | DL Data | DL Data |
| 2 | DL Control | DL Control | DL Control | DL Data | DL Data | DL Data | DL Data | DL Data | DL Data | DL Data | DL Data | DL Data | DL Data | DL Data |
| | DL Control | DL Control | DL Control | DL Data | DL Data | DL Data | DL Data | DL Data | DL Data | DL Data | DL Data | DL Data | DL Data | DL Data |

FIG. 13

| Configuration | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 3 | DL Control | DL Data | DL Data | DL Data | DL Data | DL Data | DL Data | DL Data | DL Data | DL Data | DL Data | DL Data | CSI RS | CSI RS |
| | DL Control | DL Data | DL Data | DL Data | DL Data | DL Data | DL Data | DL Data | DL Data | DL Data | DL Data | DL Data | GP | SRS/ UL Control |
| 4 | DL Control | DL Control | DL Data | DL Data | DL Data | DL Data | DL Data | DL Data | DL Data | DL Data | DL Data | DL Data | CSI RS | CSI RS |
| | DL Control | DL Control | DL Data | DL Data | DL Data | DL Data | DL Data | DL Data | DL Data | DL Data | DL Data | DL Data | GP | SRS/ UL Control |
| 5 | DL Control | DL Control | DL Control | DL Data | DL Data | DL Data | DL Data | DL Data | DL Data | DL Data | DL Data | DL Data | CSI RS | CSI RS |
| | DL Control | DL Control | DL Control | DL Data | DL Data | DL Data | DL Data | DL Data | DL Data | DL Data | DL Data | DL Data | GP | SRS/ UL Control |

SIGNAL TRANSMISSION METHOD FOR ESTIMATING PHASE NOISE IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a *reissue of U.S. Pat. No. 10,983,616 which was filed as U.S. application Ser. No. 16/738,515 on Jan. 9, 2020, which is a* continuation of U.S. application Ser. No. 16/064,977, filed on Sep. 27, 2018, now [allowed] *U.S. Pat. No. 10,587,446*, which is a National Stage application under 35 U.S.C. § 371 of International Application No. PCT/KR2017/002570, filed Mar. 9, 2017, which claims the benefit of U.S. Application No. 62/327,410, filed on Apr. 25, 2016. The disclosures of the prior applications are incorporated by reference in their entirety.

TECHNICAL FIELD

Following description relates to a wireless communication system, and more particularly, to a method of transmitting a signal for estimating phase noise in a wireless LAN system and an apparatus therefor.

BACKGROUND ART

In an ultrahigh frequency wireless communication system using mmWave, a center frequency is configured to operate in several GHz to dozens of GHz. Due to the characteristic of the center frequency, a path loss may considerably occur in a radio shadow area in the mmWave communication system. Since it is necessary to stably transmit a synchronization signal to all UEs belonging to the coverage of a base station, in the mmWave communication system, it is necessary to design and transmit a synchronization signal in consideration of a potential deep-null phenomenon capable of being occurred due to the characteristic of the ultrahigh frequency band.

DISCLOSURE OF THE INVENTION

Technical Tasks

The present invention is designed to solve the aforementioned problem. An object of the present invention is to precisely decode a reception signal by improving a phase noise estimation procedure of a terminal (or user equipment) in a wireless communication system.

Another object of the present invention is to minimize overhead of transmitting a signal for estimating phase noise.

The other object of the present invention is to define a reference signal capable of estimating phase noise and performing channel calibration.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting a signal, which is transmitted by a base station to estimate phase noise in an mmWave communication system, includes the steps of generating a PTRS (phase tracking reference signal) for estimating phase noise from a downlink signal, mapping the PTRS to a region to which a data channel is mapped with a prescribed OFDM (Orthogonal Frequency Division Multiplexing) symbol space in a downlink resource region, and transmitting the PTRS to a user equipment.

The prescribed OFDM symbol space may correspond to 2 or 4 OFDM symbol space.

A PTRS of a specific antenna port can be mapped to a subcarrier to which a DMRS (Demodulation Reference Signal) of the specific antenna port is assigned.

PTRSs of the same antenna port can be mapped to the same OFDM symbol.

PTRSs of the same antenna port mapped to a different subcarrier can be mapped to a different OFDM symbol.

An OFDM symbol to which the PTRS is mapped can be determined based on a position to which a control channel transmitted in the downlink resource region or a CSI-RS (Channel State Information-Reference Signal) and an SRS (Sounding Reference Signal) are mapped.

The PTRS can be mapped to an OFDM symbol except the position to which the control channel is mapped.

The PTRS can be mapped to an OFDM symbol except the position to which the CSI-RS and the SRS are mapped.

To further achieve these and other advantages and in accordance with the purpose of the present invention, according to a different embodiment, a base station transmitting a signal for estimating phase noise in an mmWave communication system includes a transmitter, a receiver, and a processor configured to operate in a manner of being connected with the transmitter and the receiver, the processor configured to generate a PTRS (phase tracking reference signal) for estimating phase noise from a downlink signal, the processor configured to map the PTRS to a region to which a data channel is mapped with a prescribed OFDM (Orthogonal Frequency Division Multiplexing) symbol space in a downlink resource region, the processor configured to transmit the PTRS to a user equipment.

Advantageous Effects

According to the embodiments of the present invention, the following effects may be expected.

First of all, since a phase noise estimation procedure of a user equipment is improved in a wireless communication system, it is able to precisely decode a reception signal.

Second, it is able to minimize overhead of a signal transmitted by a base station while phase noise estimation performance of a user equipment is improved.

Third, since a user equipment is able to perform not only phase noise estimation but also channel calibration, it is able to improve communication efficiency.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIGS. 12 and 13 are diagrams for explaining a mapping position of a PTRS in a subframe according to embodiments proposed in the present invention;

BEST MODE

Mode for Invention

Figure 1:
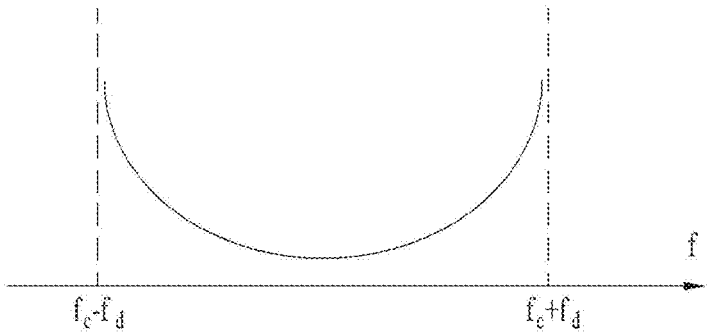
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
|---|---|
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
|---|---|---|---|---|
| | ±0.05 ppm | ±0.1 ppm | ±10 ppm | ±20 ppm |
| 2 GHz (5 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
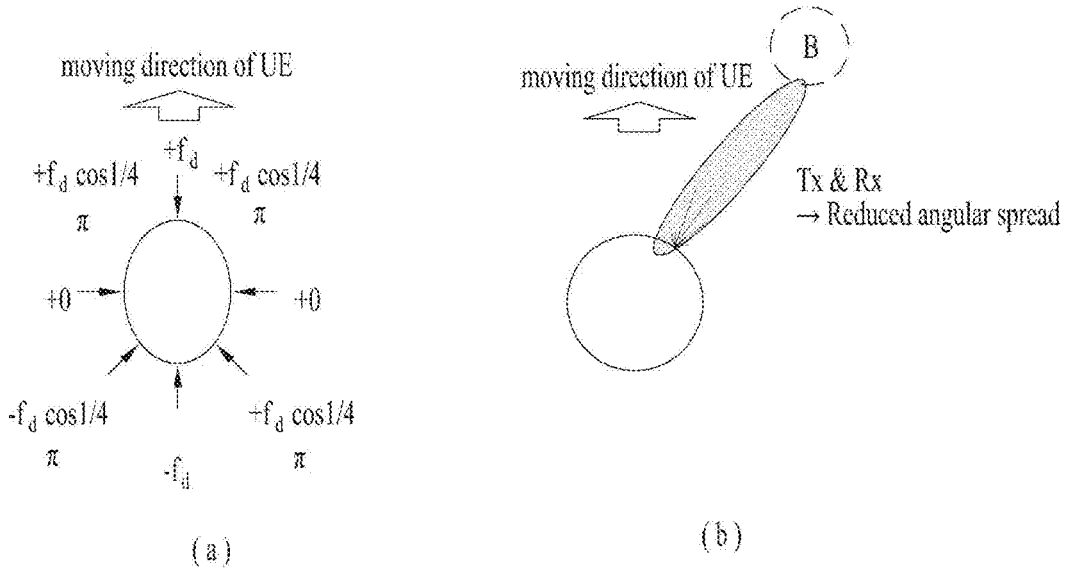
FIG. 2 is a diagram illustrating narrow beamforming related to the present invention.
Figure 3:
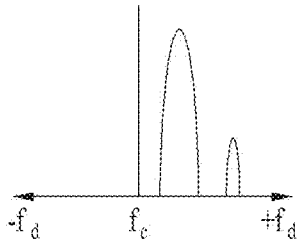
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
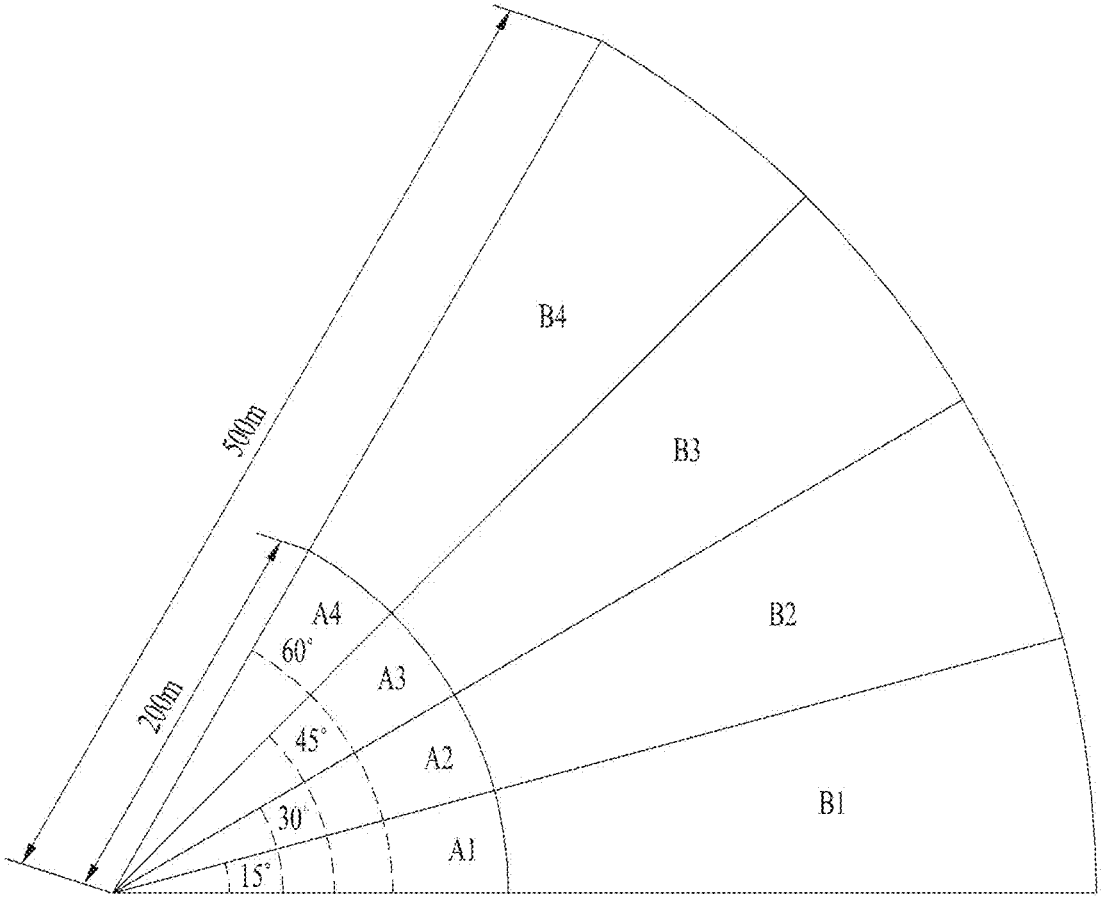
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \rightarrow M^{-2}W$$

$$SINR \rightarrow M^{2}\ SINR \qquad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
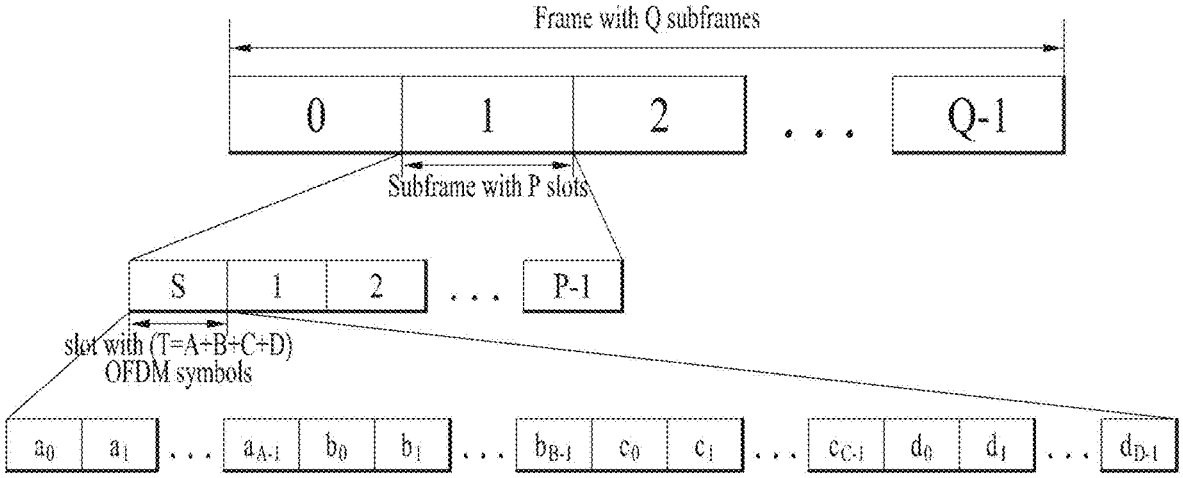
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses 0th slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\operatorname{argmax}} \frac{\left|\sum_{i=0}^{A-2} y_{\tilde{n},i}^{H} y_{\tilde{n},i+1}\right|}{\sum_{i=0}^{A-2} \left|y_{\tilde{n},i}^{H} y_{\tilde{n},i+1}\right|} \text{ where} \quad \text{[Equation 3]}$$

$$y_{\tilde{n},i} \triangleq r[\tilde{n} + i(N + N_g) : \tilde{n} + i(N + N_g) + N - 1]$$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))_{th}$ element to $(\tilde{n}+i(N+N_g)+N-1)_{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\operatorname{argmax}} \frac{\left|\sum_{i=0}^{A-1} y_{\tilde{n},i}^{H} S\right|^2}{\sum_{i=0}^{A-1} |y_{\tilde{n},i}|^2 \sum_{i=0}^{A-1} |S|^2} \quad \text{[Equation 4]}$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feeds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi rn(n+1)}{N}} \quad \text{[Equation 5]}$$

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$\left(x_r^{(i)}\right)^H x_r^{(j)} = \begin{cases} N & \text{for } i = j \\ 0 & \text{elsewhere} \end{cases} \quad \text{[Equation 6]}$$

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 7]}$$

In equation 7, $r_1$ or $r_2$ is a coprime of N. For example, if N=111, $2 \le r_1, r_2 \le 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \text{ where} \quad \text{[Equation 8]}$$

$$H_1 = [1]\, H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
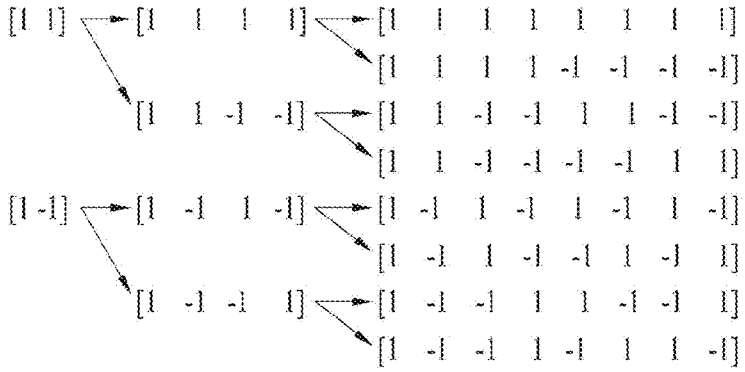
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
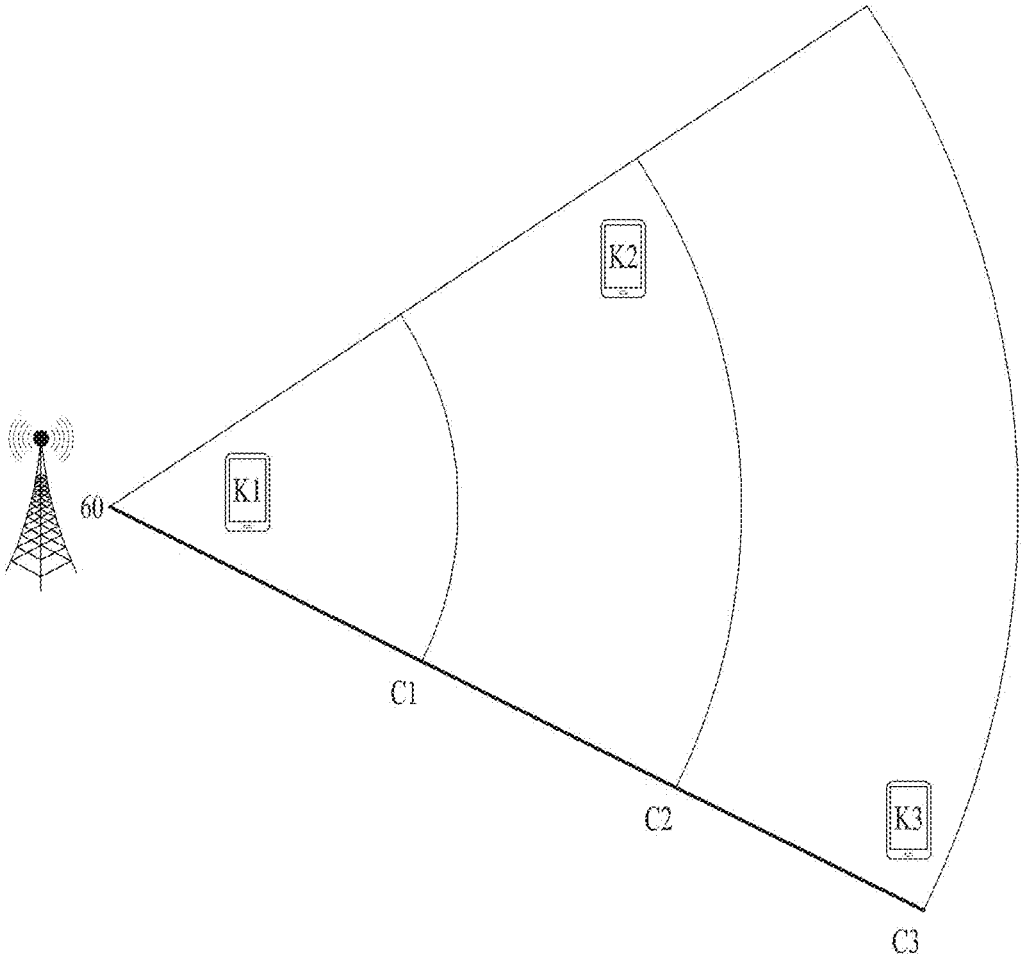
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$$P_PRACH_Initial=\min\{P_CMAX, preambleInitialReceivedTargetPower+PL\}, \quad \text{[Equation 10]}$$

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitialReceivedTarget Power | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present invention is explained. Jitter generated on a time axis appears as phase noise on a frequency axis. As shown in equation 11 in the following, the phase noise randomly changes a phase of a reception signal on the time axis.

$$r_n = s_n e^{j\phi_n} \text{ where } s_n = \sum_{k=0}^{N-1} d_k e^{j2\pi\frac{kn}{N}} \quad \text{[Equation 11]}$$

Parameters $r_n$, $s_n$, $d_k$, $\phi_n$ of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

$$y_k = d_k \frac{1}{N}\sum_{n=0}^{N-1} e^{j\phi_n} + \frac{1}{N}\sum_{\substack{t=0\\ t\neq k}}^{N-1} d_t \sum_{n=0}^{N-1} e^{j\phi_n} e^{j2\pi(t-k)m/N} \quad \text{[Equation 12]}$$

In the equation 12, $$\frac{1}{N}\sum_{n=0}^{N-1} e^{j\phi_n},\ \frac{1}{N}\sum_{\substack{t=0\\ t\neq k}}^{N-1} d_t \sum_{n=0}^{N-1} e^{j\phi_n} e^{j2\pi(t-k)m/N}$$

parameters indicate a CPE (common phase error) and ICI (inter-cell interference), respectively. In this case, as correlation between phase noises is getting bigger, the CPE of the equation 12 has a bigger value. The CPE is a sort of CFO (carrier frequency offset) in a wireless LAN system. However, since the CPE corresponds to phase noise in the aspect of a terminal, the CPE and the CFO can be similarly comprehended.

A terminal eliminates the CPE/CFO corresponding to phase noise on a frequency axis by estimating the CPE/CFO. A procedure of estimating the CPE/CFO on a reception signal should be preferentially performed by the terminal to accurately decode the reception signal. In particular, in order to make the terminal precisely estimate the CPE/CFO, a base station can transmit a prescribed signal to the terminal. The signal transmitted by the base station corresponds to a signal for estimating phase noise. The signal may correspond to a pilot signal shared between the terminal and the base station in advance or a signal changed or copied from a data signal. In the following a signal for estimating phase noise is commonly referred to as a PCRS (Phase Compensation Reference Signal), a PNRS (Phase Noise Reference Signal), or a PTRS (Phase Tracking Reference Signal). In the following, for clarity, the signal is commonly referred to as a PTRS.

Figure 8:
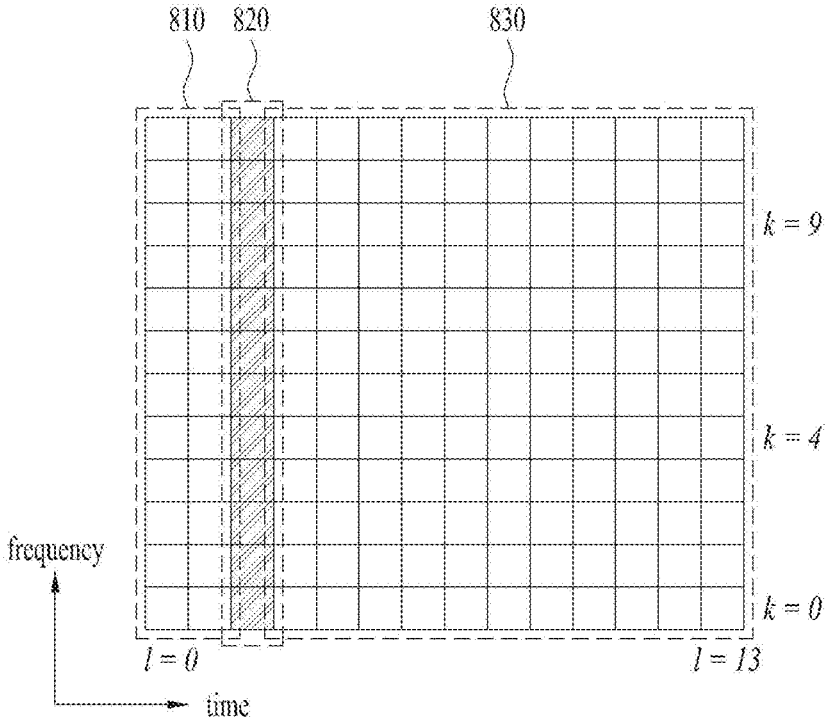
FIG. 8 is a diagram illustrating a resource region structure in a communication system that uses mmWave.

FIG. 8 is a diagram illustrating a resource region structure used in a communication system using mmWave. A communication system using such an ultrahigh frequency band as mmWave uses a frequency band having physical characteristic different from that of a legacy LTE/LTE-A communication system. Hence, it is necessary for the communication system using the ultrahigh frequency band to use a structure of a resource region different from a structure of a resource region used in a legacy communication system. FIG. 8 illustrates an example of a downlink resource structure of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated to a control channel (e.g., PDCCH (Physical Downlink Control Channel)), a next one OFDM symbol 820 is allocated to a DMRS (DeModulation Reference Signal), and the remaining OFDM symbols 830 are allocated to a data channel (e.g., PDSCH (Physical Downlink Shared Channel)).

Meanwhile, in the resource region structure shown in FIG. 8, a PCRS, a PNRS, or a PTRS for estimating the aforementioned CPE (or, the CFO) can be transmitted to a terminal in a manner of being carried on a partial RE (resource element) of the region 830 to which a data channel is assigned. The signal corresponds to a signal for estimating phase noise. As mentioned in the foregoing description, the signal may correspond to a pilot signal or a signal changed or copied from a data signal.

2. Proposed Method for Transmitting PTRS

According to a proposed embodiment, a base station transmits a PTRS (or, PCRS, or PNRS) to a terminal to enable the terminal to estimate phase noise of a reception signal. The PTRS corresponds to a pilot signal shared between the base station and the terminal and corresponds to a reference signal defined to compensate for the phase noise.

Figure 9:
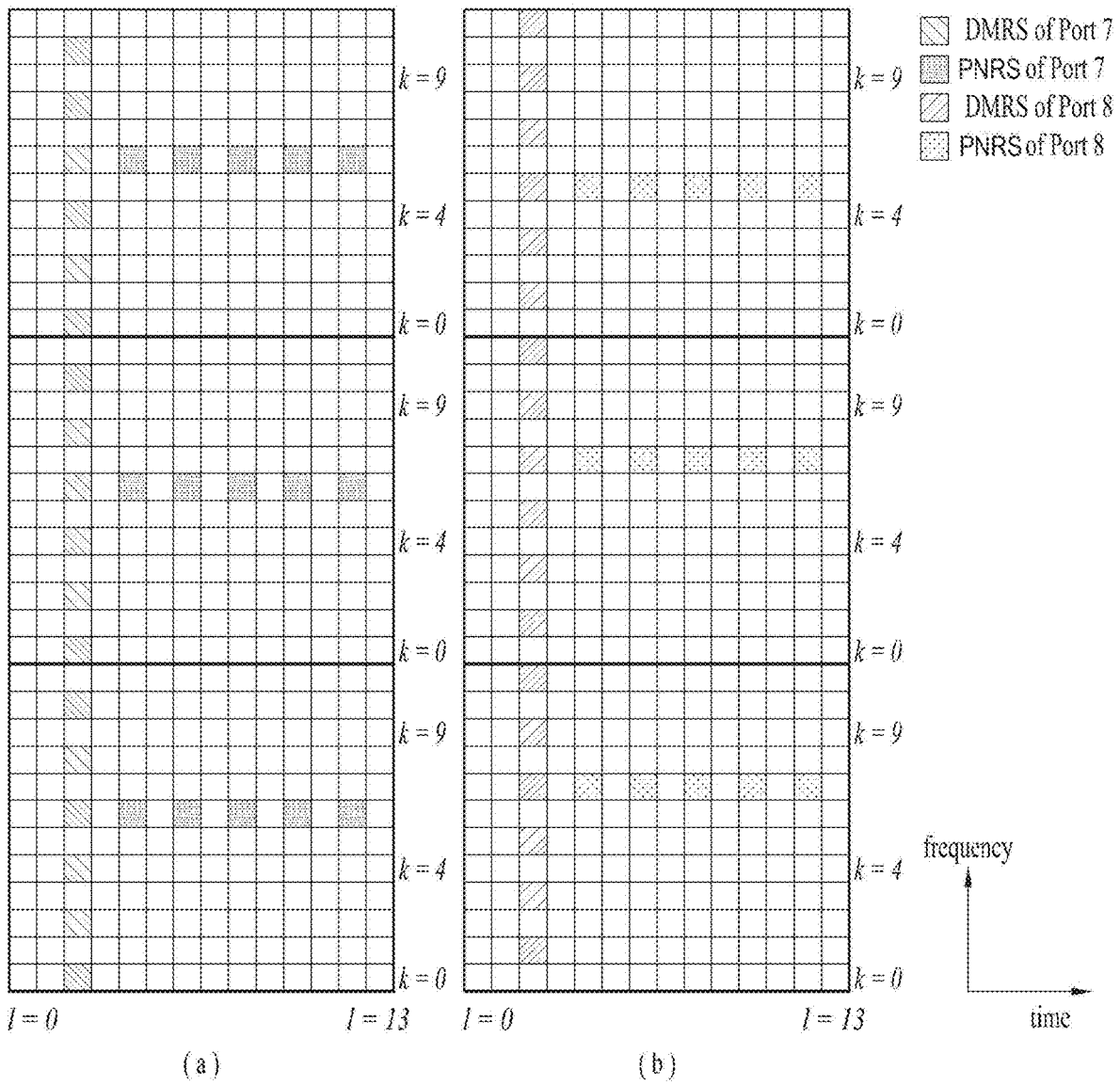
FIGS. 9 to 11 are diagrams illustrating methods of mapping a PTRS (phase tracking reference signal) to a resource region according to embodiments proposed in the present invention.
Figure 10:
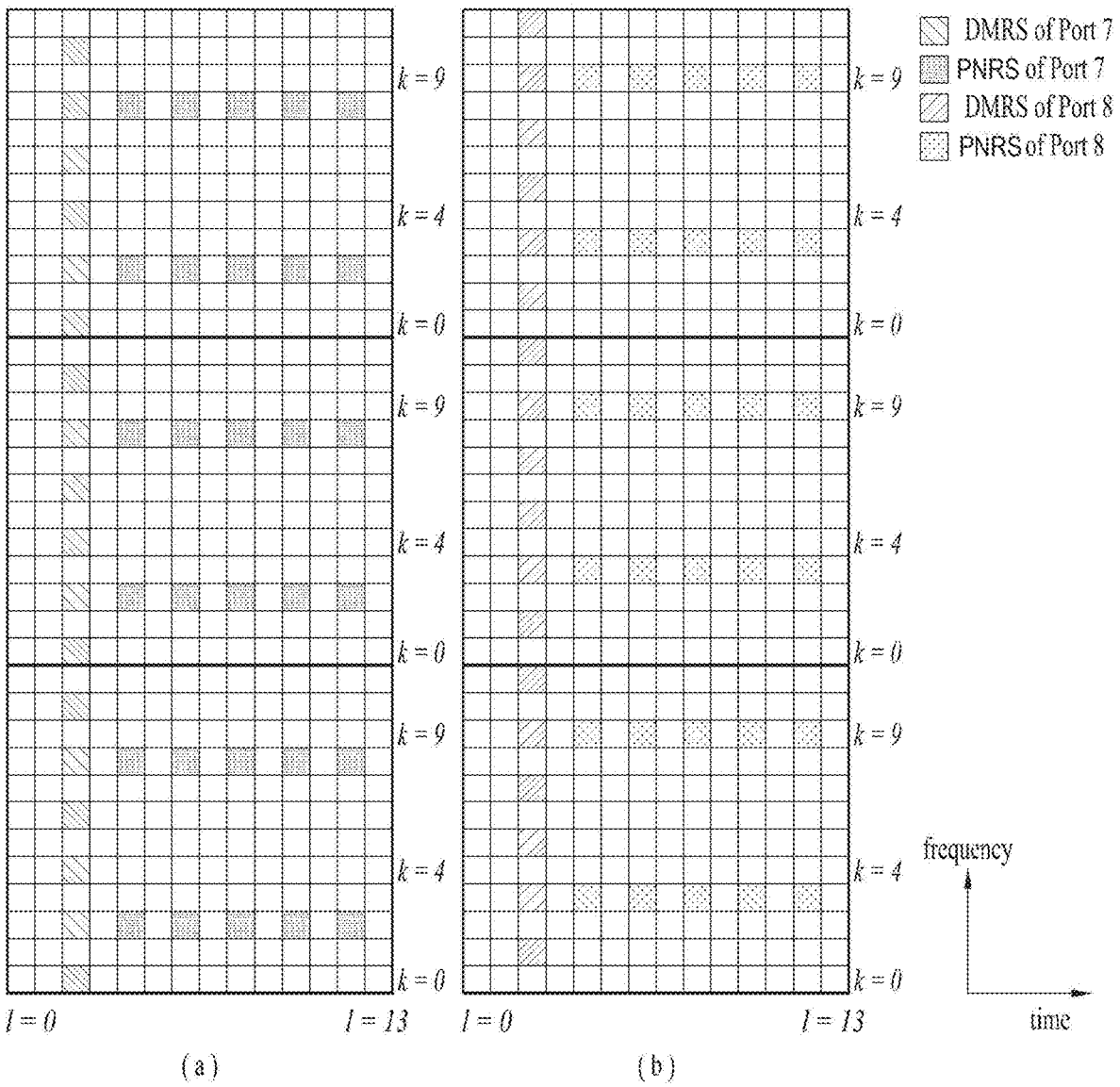
Figure 11:
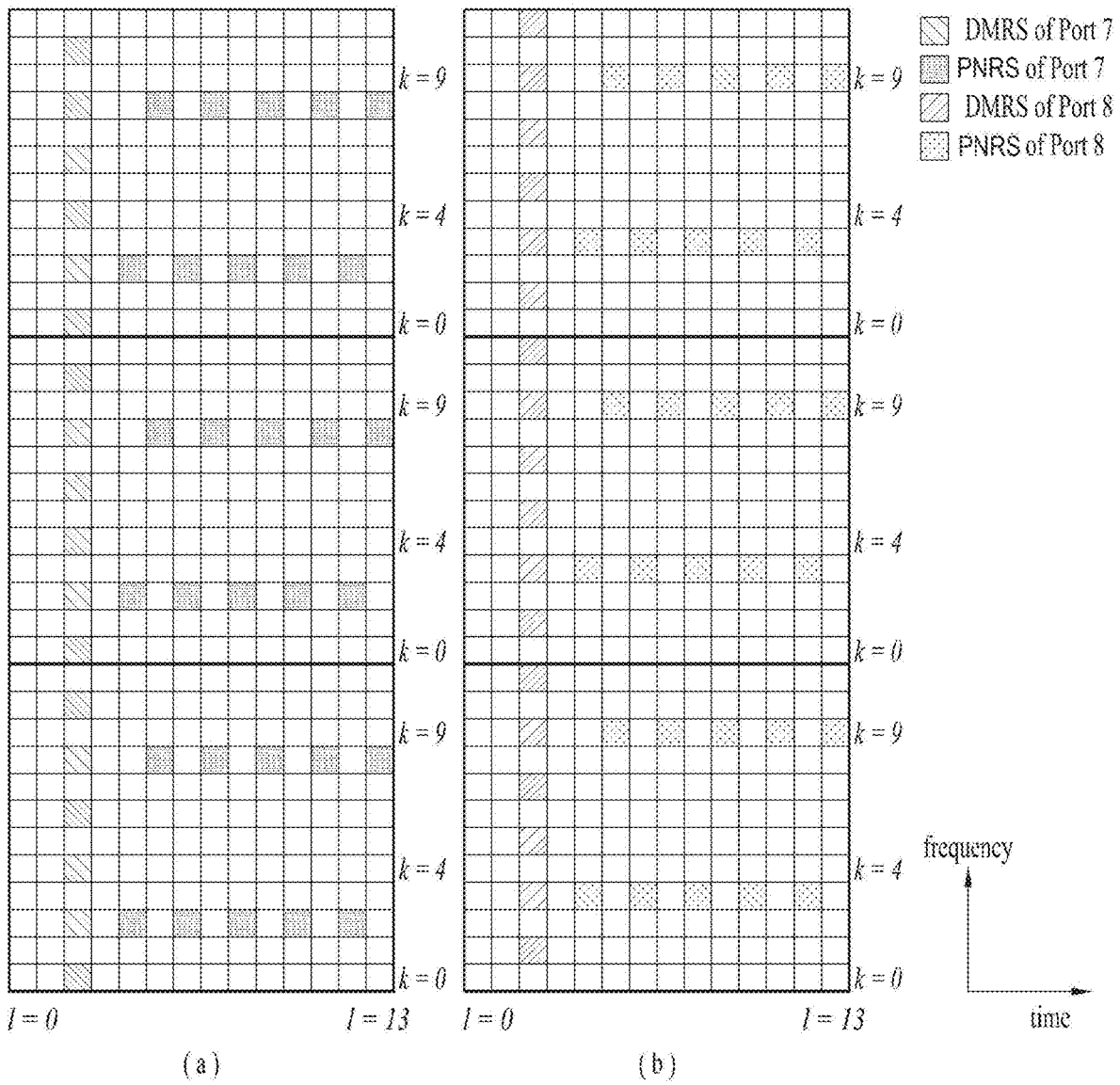

FIGS. 9 to 11 are diagrams illustrating methods for a base station to arrange (or map) a PTRS to a resource region according to a proposed embodiment. In a resource structure shown in FIGS. 9 to 11, a horizontal axis corresponds to OFDM symbols and a vertical axis corresponds to subcarriers. The left drawings shown in FIGS. 9 to 11 respectively illustrate a DMRS structure and a PTRS structure of an antenna port 7 and the right drawings respectively illustrate a DMRS structure and a PTRS structure of an antenna port 8. An embodiment of FIG. 9 is explained first.

A base station can arrange PTRSs to positions on a frequency axis to which a DMRS of a specific antenna port is assigned. In particular, since a position (e.g., subcarrier index) on a frequency axis to which a DMRS is assigned is different according to an antenna port, PTRSs of antenna ports different from each other are arranged to a different position on the frequency axis.

FIG. 9(a) and FIG. 9(b) are explained. FIG. 9(a) illustrates a DMRS structure and a PTRS structure of an antenna port 7. Referring to 3 contiguous RB pairs shown in FIG. 9(a), a DMRS of the antenna port 7 is arranged to a $3^{rd}$ OFDM symbol (l=2, k=0, 2, 4, . . . , 10) and a PTRS of the antenna port 7 is arranged to one (k=6) of subcarriers to which the DMRS is arranged.

In this case, PTRSs, which are arranged to positions (i.e., subcarriers) on the frequency axis to which the DMRS is arranged, are not arranged to every OFDM symbol. The PTRSs can be arranged with a prescribed space on the time axis. FIG. 9(a) illustrates an embodiment that PTRSs are arrange with a space of one OFDM symbol, by which the present invention may be non-limited. It may be able to arrange PTRSs, which are arranged on a subcarrier, with a space of the integer number (e.g., 0, 1, 2, 3, . . . etc.) of OFDM symbols. In particular, when PTRSs are arranged with a prescribed space on the time axis, it can be referred to as a comb type structure.

When PTRSs are arranged with the comb type structure, it may be able to reduce overall overhead of the PTRSs. For example, it may compare a case of arranging PTRSs to all OFDM symbols with a case of arranging PTRSs to OFDM symbols positioned with a space as much as 2 OFDM symbols. In this case, overhead of the PTRSs shows a difference as much as double. However, when the PTRSs are arranged with the comb type structure, if a CPE is rapidly changed in a time axis, it may have a demerit in that estimation performance is degraded.

Meanwhile, as the number of arranged PTRSs per subcarrier is getting bigger, CPE estimation performance is getting better. However, overhead for PTRS transmission increases.

FIG. 9(b) illustrates a DMRS structure and a PTRS structure of an antenna port 8. Referring to RB pairs shown in FIG. 9(b), a DMRS of the antenna port 8 is arranged to a $3^{rd}$ OFDM symbol (l=2, k=1, 3, 5, . . . , 11) and a PTRS of the antenna port 8 is arranged to one (k=7) of subcarriers to which the DMRS is arranged. In both FIG. 9(a) and FIG. 9(b), of course, PTRSs can be arranged to a different frequency axis as well, if a DMRS is arranged to the different frequency axis.

Subsequently, FIGS. 10(a) and (b) are explained. Referring to FIG. 10(a) and FIG. 10(b), the number of PTRSs arranged to the same resource region is double on a frequency axis compared to FIGS. 9(a) and (b). Referring to FIG. 10(a), PTRSs of an antenna port 7 are arranged to two subcarriers (k=2, 8) among subcarriers to which DMRSs of the antenna port 7 are arranged. Referring to FIG. 10 (b), PTRSs of an antenna port 8 are arranged to two subcarriers (k=3, 9) among subcarriers to which DMRSs of the antenna port 8 are arranged.

In particular, the embodiment shown in FIG. 10 shows a form that density of the PTRSs on the frequency axis is increased as much as two times compared to density of the PTRSs shown in the embodiment of FIG. 9. This arrangement structure enables a terminal to estimate not only a CPE but also a channel in a frequency axis. In particular, a PTRS can be used not only for estimating phase noise via CPE estimation but also for estimating a channel of frequency domain. When a channel is rapidly changed on a time axis, the channel estimation can compensate for a deteriorated channel estimation result.

Subsequently, embodiments of FIGS. 11(a) and (b) are explained. When a PTRS arrangement structure shown in FIGS. 10(a) and (b) is compared with a PTRS arrangement structure shown in FIGS. 11(a) and (b), the number of REs to which PTRSs are arranged is the same in an RB pair. Yet, referring to FIGS. 11(a) and (b), a start OFDM symbol of PTRSs is differently arranged in every frequency axis. For example, when PTRSs are arranged to a subcarrier of which K corresponds to 2, the arrangement of the PTRSs starts from an OFDM symbol of which 1 corresponds to 4. On the contrary, when PTRSs are arranged to a subcarrier of which K corresponds to 8, the arrangement of the PTRSs starts from an OFDM symbol of which 1 corresponds to 5.

In particular, an OFDM symbol at which PTRS arrangement starts may vary depending on a subcarrier to which a PTRS is arranged. This can be comprehended as PTRSs are arranged to subcarriers in a manner of hopping on a time axis. The PTRS arrangement structure shown in FIG. 11 has a merit in that a PTRS is defined in all OFDM symbols. In particular, referring to FIG. 11(a), PTRSs are arranged to a subcarrier of which k corresponds to 2 for even-numbered OFDM symbols (l=4, 6, 8, 10, and 12) and PTRSs are arranged to a subcarrier of which k corresponds to 8 for odd-numbered OFDM symbols (l=5, 7, 9, 11, and 13). In particular, the scheme shown in FIG. 11 has a merit in that PTRSs are continuously defined on a time axis. When a channel is rapidly changed, since a terminal requires a channel estimation value in every OFDM symbol, the arrangement structure shown in FIG. 11 is advantageous.

Referring to the embodiments shown in FIGS. 9 to 11, PTRSs of an antenna port and a DMRS of the antenna port are positioned at the same subcarrier. Yet, the present invention is not restricted by the embodiments. PTRSs of an antenna port can also be positioned on a subcarrier to which a DMRS is not arranged.

FIGS. 12 and 13 are diagrams for explaining a position to which a PTRS is mapped in a subframe according to a proposed embodiment. In FIGS. 12 and 13, a horizontal axis corresponds to OFDM symbol index in a subframe and a vertical axis corresponds to subframe configurations different from each other.

A terminal determines a position of an OFDM symbol to which PDCCH is arranged in a subframe via a control channel (e.g., PCFICH (physical control format indicator channel)) or signaling. For example, the terminal is able to know an OFDM symbol to which PDCCH is assigned in a subframe via PCFICH or signaling. According to legacy LTE/LTE-A, the PDCCH can be assigned maximum up to third OFDM symbol from a first PFDM symbol within a subframe. In this case, precoding different from precoding applied to a data channel (e.g., PDSCH) is applied to a control channel such as PDCCH. In particular, a PTRS is not defined in a region to which a control channel is assigned in a resource region.

Meanwhile, according to a proposed embodiment, a base station may not explicitly inform a terminal of an OFDM symbol to which a PTRS is arranged in a subframe. Although a position of the PTRS is not explicitly indicated, as mentioned in the foregoing description, the terminal can receive the PTRS in a region except an OFDM symbol to which a control channel is assigned in a subframe. For example, the terminal can determine an OFDM symbol immediately after an OFDM symbol in which PDCCH is transmitted as a position to which a PTRS is arranged in a subframe.

For example, in FIG. 12, when a subframe configuration corresponds to 0, PDCCH is assigned to positions where an OFDM symbol index corresponds to 0 ('DL control'). A terminal is able to know that data is arranged to OFDM symbol indexes 1 to 13 ('DL data'). Hence, the terminal can determine that a PTRS is arranged to the OFDM symbol indexes 1 to 13.

FIG. 13 illustrates a procedure of determining a position of a PTRS in consideration of the arrangement of a CSI-RS (channel state information-RS) and an SRS (sounding RS). If a terminal receives information indicating that a CSI-RS and/or an SRS are transmitted in a subframe from a base station, the terminal determines that a PTRS is not transmitted in an OFDM symbol to which the CSI-RS or the SRS is arranged. This is because, similar to PDCCH, different precoding is applied to the OFDM symbol in which the CSI-RS is transmitted. And, since DL transmission is not performed in an OFDM symbol in which the SRS is transmitted and an OFDM symbol configured by a GP (guard period), the terminal also determines that a PTRS is not transmitted in the OFDM symbol corresponding to the SRS and the GP.

Meanwhile, in FIG. 13, OFDM symbols configured as 'UL control' may correspond to a self-contained model according to new RAT (Radio Access Technology). In particular, if both DL transmission and UL transmission are performed in a subframe, a terminal can determine that a PTRS is not transmitted in a corresponding OFDM symbol of a downlink subframe as well.

Referring to FIGS. 12 and 13, a base station informs a terminal of a position to which a control channel is assigned instead of explicitly indicating a mapping position of a PTRS to make the terminal implicitly know the mapping position of the PTRS. On the other hand, the base station can make the terminal know a position to which a PTRS is arranged by informing the terminal of the last OFDM symbol in which a data channel is transmitted.

Figure 14:
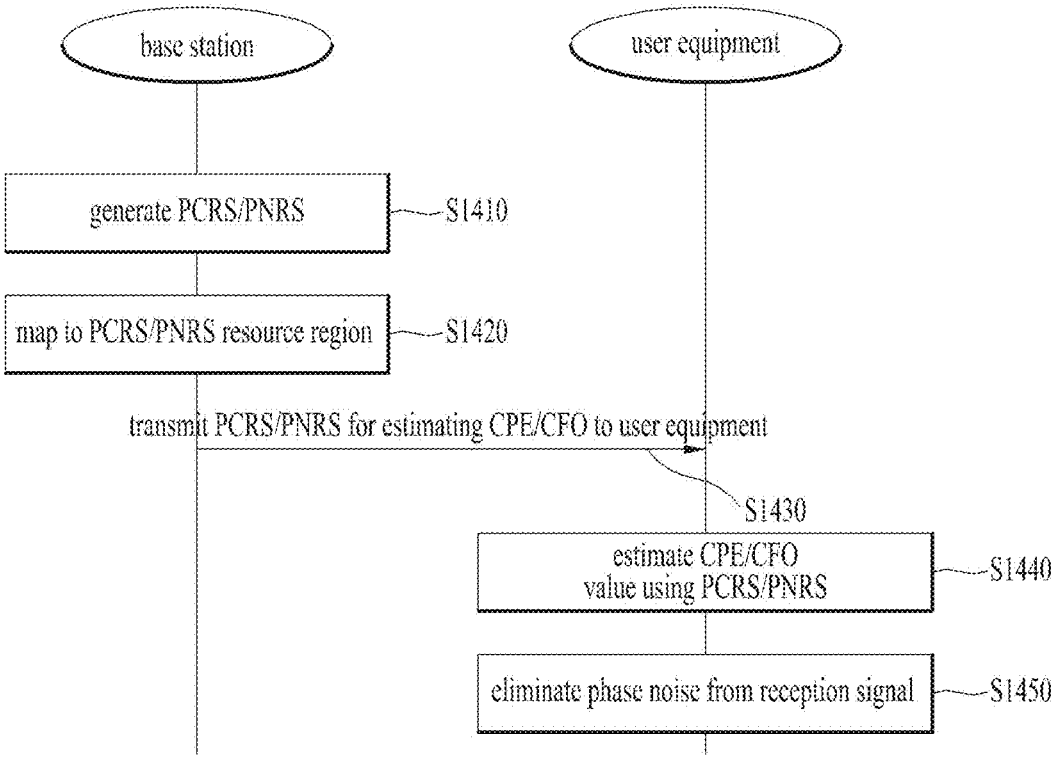
FIG. 14 is a flowchart illustrating a method of transmitting a PTRS according to an embodiment of the present invention.

FIG. 14 is a flowchart for a method of transmitting a PTRS according to a proposed embodiment. First of all, a base station generates a PTRS (or, PCRS or PNRS) [S1410]. As mentioned in the foregoing description, the PTRS corresponds to a signal used for estimating phase noise by making a terminal estimate a CPE and may correspond to a pilot signal shared in advance between the terminal and the base station.

The base station maps the PTRS to a resource region [S1420]. A PTRS of a specific antenna port can be mapped to one or more subcarriers to which a DMRS of the same antenna port is mapped. And, a PTRS can be mapped with a space of prescribed OFDM symbols on a single subcarrier. If a PTRS is mapped to two or more subcarriers in an RB pair, an OFDM symbol at which PTRS arrangement starts may vary in each of the subcarriers.

Subsequently, the base station transmits a PTRS mapped to a resource region to the terminal [S1430] and the terminal estimates a CPE (or CFO) using the PTRS [S1440]. The terminal estimates phase noise from a received signal by eliminating the impact of the estimated CPE [S1450].

In the embodiments proposed in FIGS. 9 to 14, an embodiment of transmitting a PTRS in DL has been explained. Yet, the embodiment can be extended to an embodiment that a terminal transmits a PTRS to a base station in UL.

3. Device configuration

Figure 15:
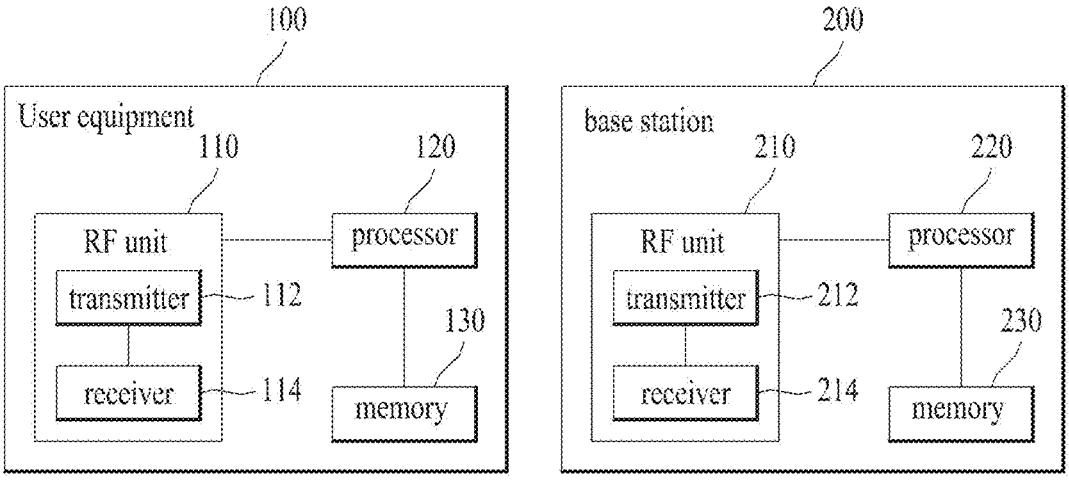
FIG. 15 is a diagram illustrating configurations of a user equipment and a base station according to an embodiment of the present invention.

FIG. 15 is a block diagram showing the configuration of a user equipment and a base station according to one embodiment of the present invention. In FIG. 15, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 15, a communication environment may be established between a plurality of user equipment and the base station. In addition, the base station 200 shown in FIG. 15 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned contents can be applied not only to 3GPP LTE and LTE-A system but also to various wireless communication systems including an IEEE 802.16x system and IEEE 802.11x system. Further, the proposed method can also be applied to an mmWave communication system using ultrahigh frequency band.

What is claimed is:

1. A method performed by a communication device operating in a wireless communication system, the method comprising:

generating a phase noise reference signal (PNRS);

generating a demodulation reference signal (DMRS);

mapping the PNRS to resources that are utilized for downlink data transmission such that:

(i) based on the DMRS being mapped in a frequency domain to a plurality of subcarriers: the PNRS is mapped to at least one subcarrier among the plurality of subcarriers to which the DMRS is mapped, and (ii) based on the DMRS being mapped in a time domain to an orthogonal frequency division multiplexing (OFDM) symbol: the PNRS is mapped to a plurality of OFDM symbols that occur after the OFDM symbol to which the DMRS is mapped, wherein the plurality of OFDM symbols are spaced apart from each other by one or more OFDM symbol durations; and transmitting, to a user equipment, (i) the PNRS mapped to the at least one subcarrier and to the plurality of OFDM symbols, and (ii) the DMRS mapped to the plurality of subcarriers and to the OFDM symbol.

2. The method of claim 1, wherein the at least one subcarrier to which the PNRS is mapped depends on an antenna port of the DMRS, and wherein the plurality of OFDM symbols to which the PNRS is mapped depends on the antenna port of the DMRS.

3. The method of claim 1, wherein the plurality of OFDM symbols to which the PNRS is mapped are spaced apart from each other by 2 OFDM symbol durations or by 4 OFDM symbol durations.

4. The method of claim 1, wherein the plurality of OFDM symbols to which the PNRS is mapped excludes an OFDM symbol mapping position of a downlink control channel.

5. The method of claim 1, wherein the plurality of OFDM symbols to which the PNRS is mapped excludes an OFDM mapping position of a channel state information reference signal (CSI-RS).

6. The method of claim 1, wherein the plurality of subcarriers to which the DMRS is mapped are arranged within a group of 12 subcarriers that are consecutive in frequency, and wherein, the at least one subcarrier to which the PNRS is mapped consists of a single subcarrier among the plurality of subcarriers to which the DMRS is mapped within the group of 12 subcarriers.

7. The method of claim 1, wherein the plurality of subcarriers to which the DMRS is mapped extend across a plurality of groups of subcarriers, with each group consisting of 12 subcarriers that are consecutive in frequency, and wherein the at least one subcarrier to which the PNRS is mapped comprises multiple subcarriers with a single subcarrier in each group of 12 subcarriers.

8. A communication device configured to operate in a wireless communication system, the communication device comprising:

at least one radio frequency (RF) module;

at least one processor; and at least one computer memory operably connectable to the at least one processor and storing instructions that, when executed by the at least one processor, perform operations comprising:

generating a phase noise reference signal (PNRS);

generating a demodulation reference signal (DMRS);

mapping the PNRS to resources that are utilized for downlink data transmission such that:

(i) based on the DMRS being mapped in a frequency domain to a plurality of subcarriers: the PNRS is mapped to at least one subcarrier among the plurality of subcarriers to which the DMRS is mapped, and (ii) based on the DMRS being mapped in a time domain to an orthogonal frequency division multiplexing (OFDM) symbol: the PNRS is mapped to a plurality of OFDM symbols that occur after the OFDM symbol to which the DMRS is mapped, wherein the plurality of OFDM symbols are spaced apart from each other by one or more OFDM symbol durations; and transmitting, to a user equipment through the at least one RF module, (i) the PNRS mapped to the at least one subcarrier and to the plurality of OFDM symbols, and (ii) the DMRS mapped to the plurality of subcarriers and to the OFDM symbol.

9. The communication device of claim 8, wherein the at least one subcarrier to which the PNRS is mapped depends on an antenna port of the DMRS, and wherein the plurality of OFDM symbols to which the PNRS is mapped depends on the antenna port of the DMRS.

10. The communication device of claim 8, wherein the plurality of OFDM symbols to which the PNRS is mapped are spaced apart from each other by 2 OFDM symbol durations or by 4 OFDM symbol durations.

11. The communication device of claim 8, wherein the plurality of OFDM symbols to which the PNRS is mapped excludes an OFDM symbol mapping position of a downlink control channel.

12. The communication device of claim 8, wherein the plurality of OFDM symbols to which the PNRS is mapped excludes an OFDM mapping position of a channel state information reference signal (CSI-RS).

13. The communication device of claim 8, wherein the plurality of subcarriers to which the DMRS is mapped are arranged within a group of 12 subcarriers that are consecutive in frequency, and wherein, the at least one subcarrier to which the PNRS is mapped consists of a single subcarrier among the plurality of subcarriers to which the DMRS is mapped within the group of 12 subcarriers.

14. The communication device of claim 8, wherein the plurality of subcarriers to which the DMRS is mapped extend across a plurality of groups of subcarriers, with each group consisting of 12 subcarriers that are consecutive in frequency, and wherein the at least one subcarrier to which the PNRS is mapped comprises multiple subcarriers with a single subcarrier in each group of 12 subcarriers.

15. An apparatus configured to control a communication device to operate in a wireless communication system, the apparatus comprising:

at least one processor; and at least one computer memory operably connectable to the at least one processor and storing instructions that, when executed by the at least one processor, perform operations comprising:

generating a phase noise reference signal (PNRS);

generating a demodulation reference signal (DMRS);

mapping the PNRS to resources that are utilized for downlink data transmission such that:

(i) based on the DMRS being mapped in a frequency domain to a plurality of subcarriers: the PNRS is mapped to at least one subcarrier among the plurality of subcarriers to which the DMRS is mapped, and (ii) based on the DMRS being mapped in a time domain to an orthogonal frequency division multiplexing (OFDM) symbol: the PNRS is mapped to a plurality of OFDM symbols that occur after the OFDM symbol to which the DMRS is mapped, wherein the plurality of OFDM symbols are spaced apart from each other by one or more OFDM symbol durations; and transmitting, to a user equipment, (i) the PNRS mapped to the at least one subcarrier and to the plurality of OFDM symbols, and (ii) the DMRS mapped to the plurality of subcarriers and to the OFDM symbol.

16. The apparatus of claim 15, wherein the at least one subcarrier to which the PNRS is mapped depends on an antenna port of the DMRS, and wherein the plurality of OFDM symbols to which the PNRS is mapped depends on the antenna port of the DMRS.

17. The apparatus of claim 15, wherein the plurality of OFDM symbols to which the PNRS is mapped are spaced apart from each other by 2 OFDM symbol durations or by 4 OFDM symbol durations.

18. The apparatus of claim 15, wherein the plurality of OFDM symbols to which the PNRS is mapped excludes an OFDM symbol mapping position of a downlink control channel.

19. The apparatus of claim 15, wherein the plurality of OFDM symbols to which the PNRS is mapped excludes an OFDM mapping position of a channel state information reference signal (CSI-RS).

20. The apparatus of claim 15, wherein the plurality of subcarriers to which the DMRS is mapped are arranged within a group of 12 subcarriers that are consecutive in frequency, and wherein, the at least one subcarrier to which the PNRS is mapped consists of a single subcarrier among the plurality of subcarriers to which the DMRS is mapped within the group of 12 subcarriers.

*21. A method performed by a communication device operating in a wireless communication system, the method comprising:*

*generating a phase noise reference signal (PNRS);*

*generating a demodulation reference signal (DMRS);*

*mapping the PNRS to resources that are utilized for downlink transmission of data, such that:*

*(i) based on the DMRS being mapped in a frequency domain to a plurality of subcarriers: the PNRS is mapped to at least one subcarrier among the plurality of subcarriers to which the DMRS is mapped, and*

*(ii) for the at least one subcarrier to which both the PNRS and the DMRS are mapped, and based on the DMRS being mapped in a time domain to an orthogonal frequency division multiplexing (OFDM) symbol within a time slot of 14 OFDM symbols: the PNRS is mapped to a plurality of OFDM symbols within the time slot spaced apart from each other by one or more OFDM symbol durations to which the data is mapped, and the PNRS is not mapped to any OFDM symbols before the OFDM symbol to which the DMRS is mapped in the time slot, wherein the DMRS is for demodulation of the data that is mapped to the one or more OFDM symbols between the plurality of OFDM symbols to which the PNRS is mapped on the at least one subcarrier; and*

*transmitting, to a user equipment, (i) the PNRS mapped to the at least one subcarrier and to the plurality of OFDM symbols, (ii) the DMRS mapped to the plurality of subcarriers and to the OFDM symbol, and (iii) the data mapped to the at least one subcarrier and to the one or more OFDM symbols between the plurality of OFDM symbols to which the PNRS is mapped.*

*22. The method of claim 21, wherein the at least one subcarrier to which the PNRS is mapped depends on an antenna port of the DMRS, and*

*wherein the plurality of OFDM symbols to which the PNRS is mapped depends on the antenna port of the DMRS.*

*23. The method of claim 21, wherein the plurality of OFDM symbols to which the PNRS is mapped are spaced apart from each other by 2 OFDM symbol durations or by 4 OFDM symbol durations.*

*24. The method of claim 21, wherein the plurality of OFDM symbols to which the PNRS is mapped excludes an OFDM symbol mapping position of a downlink control channel.*

*25. The method of claim 21, wherein the plurality of OFDM symbols to which the PNRS is mapped excludes an OFDM mapping position of a channel state information reference signal (CSI-RS).*

*26. The method of claim 21, wherein the plurality of subcarriers to which the DMRS is mapped are arranged within a group of 12 subcarriers that are consecutive in frequency, and*

*wherein, the at least one subcarrier to which the PNRS is mapped consists of a single subcarrier among the plurality of subcarriers to which the DMRS is mapped within the group of 12 subcarriers.*

*27. The method of claim 21, wherein the plurality of subcarriers to which the DMRS is mapped extend across a plurality of groups of subcarriers, with each group consisting of 12 subcarriers that are consecutive in frequency, and*

*wherein the at least one subcarrier to which the PNRS is mapped comprises multiple subcarriers with a single subcarrier in each group of 12 subcarriers.*

*28. A communication device configured to operate in a wireless communication system, the communication device comprising:*

*at least one radio frequency (RF) module;*

*at least one processor; and*

*at least one computer memory operably connectable to the at least one processor and storing instructions that, when executed by the at least one processor, perform operations comprising:*

*generating a phase noise reference signal (PNRS);*

*generating a demodulation reference signal (DMRS);*

*mapping the PNRS to resources that are utilized for downlink transmission of data, such that:*

*(i) based on the DMRS being mapped in a frequency domain to a plurality of subcarriers: the PNRS is mapped to at least one subcarrier among the plurality of subcarriers to which the DMRS is mapped, and*

*(ii) for the at least one subcarrier to which both the PNRS and the DMRS are mapped, and based on the DMRS being mapped in a time domain to an orthogonal frequency division multiplexing (OFDM) symbol within a time slot of 14 OFDM symbols: the PNRS is mapped to a plurality of OFDM symbols within the time slot spaced apart from each other by one or more OFDM symbol durations to which the data is mapped, and the PNRS is not mapped to any OFDM symbols before the OFDM symbol to which the DMRS is mapped in the time slot, wherein the DMRS is for demodulation of the data that is mapped to the one or more OFDM symbols between the plurality of OFDM symbols to which the PNRS is mapped on the at least one subcarrier; and*

*transmitting, to a user equipment through the at least one RF module, (i) the PNRS mapped to the at least one subcarrier and to the plurality of OFDM symbols, (ii) the DMRS mapped to the plurality of subcarriers and to the OFDM symbol, and (iii) the data mapped to the at least one subcarrier and to the one or more OFDM symbols between the plurality of OFDM symbols to which the PNRS is mapped.*

*29. The communication device of claim 28, wherein the at least one subcarrier to which the PNRS is mapped depends on an antenna port of the DMRS, and*

*wherein the plurality of OFDM symbols to which the PNRS is mapped depends on the antenna port of the DMRS.*

*30. The communication device of claim 28, wherein the plurality of OFDM symbols to which the PNRS is mapped are spaced apart from each other by 2 OFDM symbol durations or by 4 OFDM symbol durations.*

*31. The communication device of claim 28, wherein the plurality of OFDM symbols to which the PNRS is mapped excludes an OFDM symbol mapping position of a downlink control channel.*

*32. The communication device of claim 28, wherein the plurality of OFDM symbols to which the PNRS is mapped excludes an OFDM mapping position of a channel state information reference signal (CSI-RS).*

*33. The communication device of claim 28, wherein the plurality of subcarriers to which the DMRS is mapped are arranged within a group of 12 subcarriers that are consecutive in frequency, and*

*wherein, the at least one subcarrier to which the PNRS is mapped consists of a single subcarrier among the plurality of subcarriers to which the DMRS is mapped within the group of 12 subcarriers.*

*34. The communication device of claim 28, wherein the plurality of subcarriers to which the DMRS is mapped extend across a plurality of groups of subcarriers, with each group consisting of 12 subcarriers that are consecutive in frequency, and*

*wherein the at least one subcarrier to which the PNRS is mapped comprises multiple subcarriers with a single subcarrier in each group of 12 subcarriers.*

*35. An apparatus configured to control a communication device to operate in a wireless communication system, the apparatus comprising:*

*at least one processor; and*

*at least one computer memory operably connectable to the at least one processor and storing instructions that, when executed by the at least one processor, perform operations comprising:*

*generating a phase noise reference signal (PNRS);*

*generating a demodulation reference signal (DMRS);*

*mapping the PNRS to resources that are utilized for downlink transmission of data, such that:*

*(i) based on the DMRS being mapped in a frequency domain to a plurality of subcarriers: the PNRS is mapped to at least one subcarrier among the plurality of subcarriers to which the DMRS is mapped, and*

*(ii) for the at least one subcarrier to which both the PNRS and the DMRS are mapped, and based on the DMRS being mapped in a time domain to an orthogonal frequency division multiplexing (OFDM) symbol within a time slot of 14 OFDM symbols: the PNRS is mapped to a plurality of OFDM symbols within the time slot spaced apart from each other by one or more OFDM symbol durations to which the*

*data is mapped, and the PNRS is not mapped to any OFDM symbols before the OFDM symbol to which the DMRS is mapped in the time slot, wherein the DMRS is for demodulation of the data that is mapped to the one or more OFDM symbols between the plurality of OFDM symbols to which the PNRS is mapped on the at least one subcarrier; and*

*transmitting, to a user equipment, (i) the PNRS mapped to the at least one subcarrier and to the plurality of OFDM symbols, (ii) the DMRS mapped to the plurality of subcarriers and to the OFDM symbol, and (iii) the data mapped to the at least one subcarrier and to the one or more OFDM symbols between the plurality of OFDM symbols to which the PNRS is mapped.*

*36. The apparatus of claim 35, wherein the at least one subcarrier to which the PNRS is mapped depends on an antenna port of the DMRS, and*

*wherein the plurality of OFDM symbols to which the PNRS is mapped depends on the antenna port of the DMRS.*

*37. The apparatus of claim 35, wherein the plurality of OFDM symbols to which the PNRS is mapped are spaced apart from each other by 2 OFDM symbol durations or by 4 OFDM symbol durations.*

*38. The apparatus of claim 35, wherein the plurality of OFDM symbols to which the PNRS is mapped excludes an OFDM symbol mapping position of a downlink control channel.*

*39. The apparatus of claim 35, wherein the plurality of OFDM symbols to which the PNRS is mapped excludes an OFDM mapping position of a channel state information reference signal (CSI-RS).*

*40. The apparatus of claim 35, wherein the plurality of subcarriers to which the DMRS is mapped are arranged within a group of 12 subcarriers that are consecutive in frequency, and*

*wherein, the at least one subcarrier to which the PNRS is mapped consists of a single subcarrier among the plurality of subcarriers to which the DMRS is mapped within the group of 12 subcarriers.*

* * * * *